Patented Aug. 12, 1924.

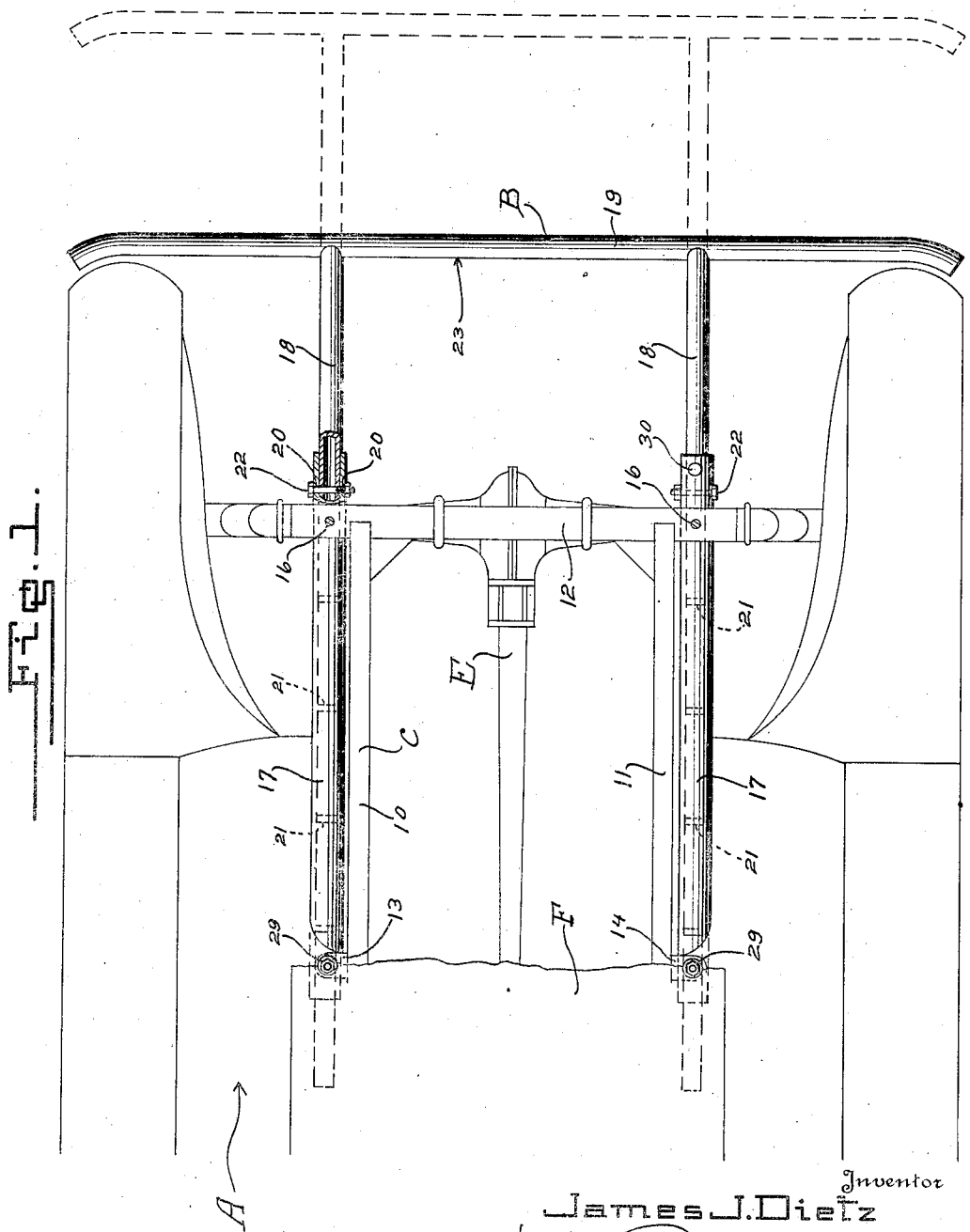

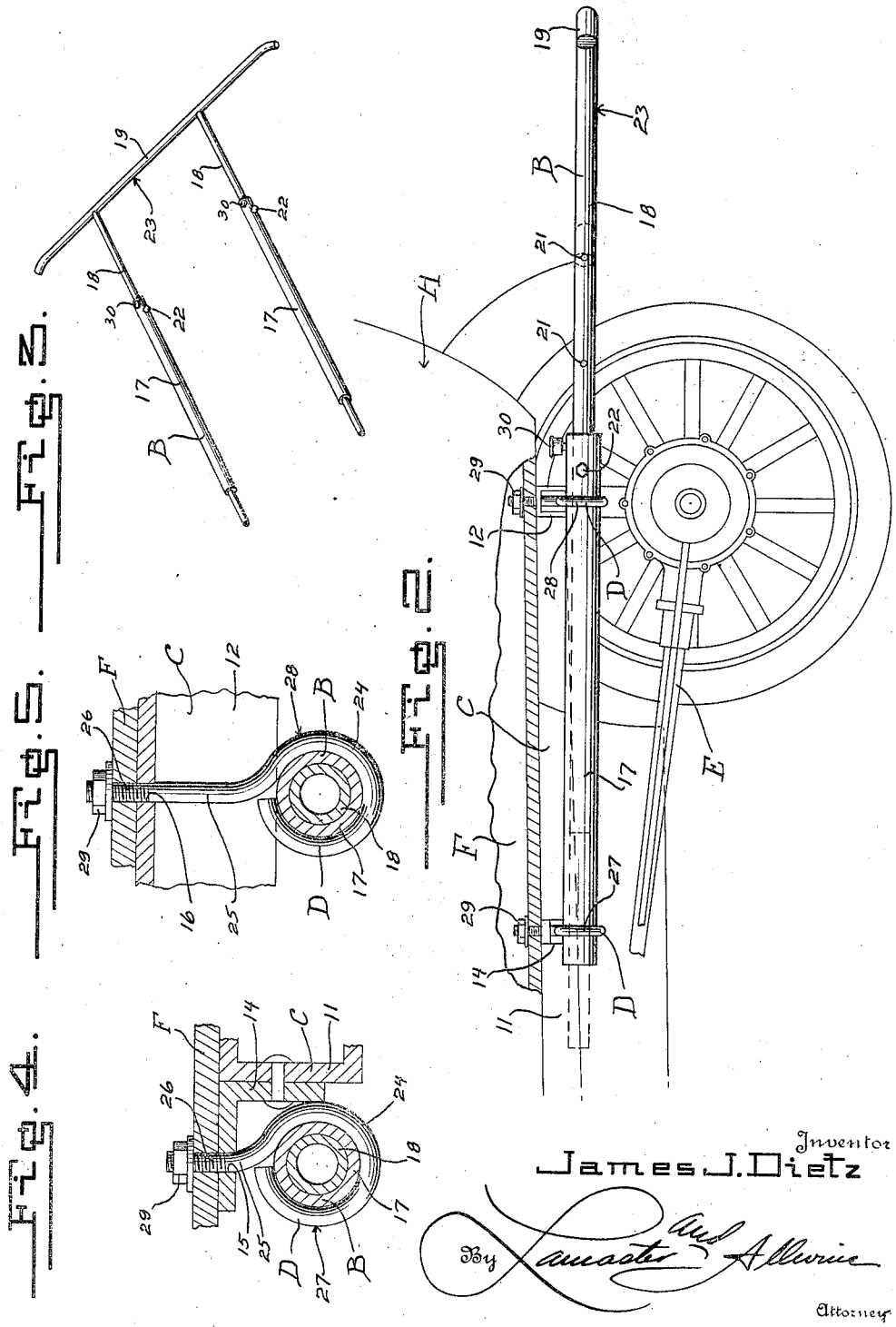

1,504,679

UNITED STATES PATENT OFFICE.

JAMES JOSEPH DIETZ, OF SOUTH JACKSONVILLE, FLORIDA.

EXTENSIBLE BUMPER FOR VEHICLES.

Application filed April 7, 1924. Serial No. 704,863.

*To all whom it may concern:*

Be it known that I, JAMES J. DIETZ, a citizen of the United States, residing at South Jacksonville, in the county of Duval and State of Florida, have invented certain new and useful Improvements in an Extensible Bumper for Vehicles, of which the following is a specification.

The present invention relates to attachments for vehicles, and more specifically to an improved bumper especially well adapted for connection to that type of frame employed in the construction of the well known "Ford" type of motor vehicle, as described in the publication "Ford Manual," copyrighted 1919 by "Ford Motor Company."

The primary object of the invention is the provision of a novel bumper which may be readily applied to the frame of a Ford motor vehicle by merely removing certain of the fastening elements embodied in the vehicle, and substituting differently shaped fastening elements therefor; the replace fastening elements serving the purpose of the removed elements, and serving as means for securing the attachment to the vehicle frame.

Another object of the invention is to provide a device of the character described, embodying features whereby the projecting portion of the device may be moved to a position relatively close to the rear portion of the vehicle when acting as merely a bumper, or moved rearwardly to various extended positions when serving the purpose of a combined bumper and luggage carrier.

A still further object of the invention is the provision of an efficient extensible bumper for vehicles, embodying features whereby the extensible portion of the bumper will be retained in a positive manner, in any of its various adjusted positions with respect to the stationary portion of the bumper.

A further object of the invention is to provide a device of the character described which will be durable and simple in operation, one which may be economically manufactured, and therefore placed on the market at a reasonable purchasing price to the user, and one which may be readily and easily applied to the aforementioned type of vehicle frame without the necessity of altering the construction thereof.

Other objects of my invention will appear in the following detailed description, taken in connection with the accompanying drawings, forming a part of this specification, and in which drawings, Figure 1 is a top plan view of the device, shown applied to the rear portion of a frame of a motor vehicle; the device being shown in a retracted position with portions broken away to disclose details.

Figure 2 is a side elevation of the device showing the manner of attachment to the vehicle frame, and showing the extensible portion of the device held in a partially extended position.

Figure 3 is a perspective view of the extensible bumper assemblage.

Figure 4 is an enlarged transverse section taken through the vehicle frame and bumper assemblage at the point of the forward attaching element.

Figure 5 is an enlarged transverse section taken through the vehicle frame and bumper assemblage at the point of the rear attaching element.

Referring to the drawings in detail, and wherein like characters designate corresponding parts throughout the several views, A designates a motor vehicle of the type described, and B my improved adjustable bumper adapted for attachment to the vehicle frame C by means of attaching elements D; the vehicle also embodying the usual running gear E and body F.

The frame C comprises the two parallel spaced side members 10 and 11, which are connected at their rear end portions by the usual rear cross member 12. Positioned forwardly of the cross member 12 and secured to the outer opposite faces of the side members 10 and 11, are the angular body brackets 13 and 14 having openings 15 provided in their horizontal flanges, and through which the usual body securing bolts are adapted to extend for fastening the body F to the frame C. Provided adjacent the end portions of the rear cross member 12, are openings 16, through which additional body securing bolts are adapted to extend for further fastening the body to the frame as is well known in the type of vehicle aforementioned.

The adjustable bumper B which is adapted for connection to the rear portion of the frame C, comprises a pair of tubular supporting members 17, each of which is adapted to slidably and telescopically receive respective supporting arms 18, being connected at their outer ends by a continuous, transversely extending bumper bar 19.

The tubular supporting members 17 are provided adjacent their rear end portions with two diametrically opposite holes 20; while the respective supporting arms 18 are provided with a number of transverse holes 21 in spaced relation longitudinally of the arms, so that single bolts or fastening elements 22 may be used in connection with each companion supporting member and arm to retain the extensible bumper portion 23 in any desired adjusted position. The bumper portion 23 may be extended or retracted by merely removing the bolt 22 and moving the portion 23 in the desired direction until one of the transverse holes 21 aligns with one of the diametrically opposite holes 20 of the members 17, and then by passing a bolt through the aligned openings in each companion supporting member and arm, and turning a nut tightly upon the threaded shank end of the bolt, the bumper portion 23 will be positively held in an adjusted position.

The attaching elements D are preferably in the form of eye bolts, and embody an eye or loop 24 having an integrally formed shank 25 being screw threaded at its outer end as at 26. The eye bolts or attaching elements D are used in pairs, with the shank portion of the forward attaching element 27 relatively shorter than that of the rear attaching element 28. The eyes 24 of the attaching elements are adapted to receive and grip the tubular supporting member 17, while the shank portions of the eye bolts 27 and 28 are adapted to extend upwardly through the respective body bolt openings 15 and 16, and have threaded upon the screw threaded shank portion thereof, nuts 29, which when turned down upon their respective shanks, will rigidly clamp the members 17 to the frame C.

It will be seen from observing Figures 2 and 5, that the rear portion of the supporting members 17 will be drawn into binding engagement with the lower edges of the flanges of the rear cross member 12, and from Figure 4, that the forward ends of the members 17 will be firmly held adjacent the body brackets 14, for preventing vertical and lateral movement of the bumper assemblage.

A grease cup 30 may be carried by each member for lubricating the arms 18, in order that the bumper portion 23 may be moved freely within the supporting members.

It will therefore be seen that an efficient and durable bumper has been provided which may be readily and quickly attached to a frame of the described character, one which may be readily moved and held in any adjusted position, and one wherein the adjustable features of the device do not weaken the functions thereof when acting as a bumper or guard for the vehicle.

Changes in detail may be made without departing from the spirit or scope of my invention; but,

I claim:

1. In combination with the frame of a vehicle, a bumper comprising tubular supporting members attached to said frame, a bumper portion having supporting arms slidable in said supporting members, and fastening elements extending through each companion supporting member and arm for retaining the bumper portion in any desired adjusted position with respect to the vehicle frame and supporting members.

2. In combination with the frame of a vehicle, a bumper comprising a pair of tubular supporting members, means for rigidly attaching the supporting members to said frame, a bumper portion having supporting arms slidable in said supporting members, and connected at their outer ends by a laterally extending bumper bar, each of said companion supporting members and supporting arms being provided, one with a number of transverse holes in spaced apart relation longitudinally of the element, and the other with a single transverse hole, and a single fastening element for each companion supporting member and supporting arm, adapted to extend through the single transverse hole provided in one element and any desired aligned hole of the companion element, for retaining the bumper portion in any desired adjusted position with respect to the vehicle frame and supporting members.

3. In combination with the frame of a vehicle, a bumper comprising a pair of tubular supporting members each provided with two diametrically opposite holes, means for rigidly attaching the supporting members to said frame, a bumper portion having supporting arms slidable longitudinally in said supporting members, and connected at their outer ends by a laterally extending bumper bar, each of said supporting arms provided with a number of transverse holes in spaced apart relation longitudinally thereof, and a single fastening element extending through the openings in each supporting member and any desired aligned opening in the companion supporting arm, for retaining the bumper portion in any desired adjusted position with respect to the vehicle frame.

4. In combination with a vehicle embodying a frame comprising two parallel spaced side members connected at their rear end portions by a rear cross member, angular body brackets secured to the outer opposite faces of the side members forwardly of the cross member, and a body on said frame, a combined bumper and article carrier attached to such vehicle construction comprising a pair of tubular supporting members, a bumper portion having supporting arms slidable longitudinally in said supporting members, means extending through each companion supporting member and arm for retaining the bumper portion in any desired adjusted position with respect to the vehicle, and means rigidly attaching the device and body to said frame comprising elements receiving the supporting members having shanks extending upwardly through said cross member and brackets, and nuts on said shanks whereby the body will be held in position upon the frame, and the bumper held in operative position upon the frame.

5. A bumper for vehicles comprising a pair of tubular members, each provided adjacent one end with diametrically opposite holes, screw threaded shanks secured to said tubular members adjacent each end thereof, arms slidable in said tubular members, each of which being provided with a number of transverse holes in spaced apart relation longitudinally thereof, a bar connecting the outer ends of said arms, and a single fastening element extending through the openings in each tubular member and any desired aligned opening in the companion arm, for retaining the arms and connecting rod in any desired adjusted position with respect to the tubular members.

JAMES JOSEPH DIETZ.